United States Patent [19]
McElroy et al.

[11] Patent Number: 6,038,781
[45] Date of Patent: Mar. 21, 2000

[54] METHOD OF DE-ICING AN AIRCRAFT

[75] Inventors: Timothy Patrick McElroy; Christopher Patrick McElroy, both of Glendale; Lucian G. McElroy, Carefree, all of Ariz.

[73] Assignee: Proto-Vest, Inc., Glendale, Ariz.

[21] Appl. No.: 09/268,959

[22] Filed: Mar. 16, 1999

Related U.S. Application Data

[62] Division of application No. 09/025,061, Feb. 17, 1998, Pat. No. 5,950,324.

[51] Int. Cl.[7] ....................................................... F26B 7/00
[52] U.S. Cl. .................................................. 34/38; 34/442
[58] Field of Search .............................. 34/380, 413, 427, 34/442, 210, 218, 221, 222, 229, 230, 232, 666; 15/312.2, 316.1, 405; 244/134 R, 134 C, 130

[56] References Cited

U.S. PATENT DOCUMENTS

| 3,600,224 | 8/1971 | Stilwell ........................................ 134/6 |
| 3,612,075 | 10/1971 | Cook ...................................... 134/99.1 |
| 4,161,801 | 7/1979 | Day et al. ............................... 15/316.1 |
| 4,378,755 | 4/1983 | Magnusson et al. ................... 118/684 |
| 4,418,442 | 12/1983 | Day et al. ............................... 15/312.2 |
| 5,104,068 | 4/1992 | Krilla et al. ........................ 244/134 R |
| 5,114,100 | 5/1992 | Rudolph et al. ..................... 244/134 C |
| 5,553,346 | 9/1996 | McElroy et al. ........................ 15/316.1 |

*Primary Examiner*—Stephen Gravini
*Attorney, Agent, or Firm*—Howard & Howard

[57] ABSTRACT

The assembly includes a plurality of flexible and inflatable bags 43, 44, 45, 46, 47, 48, 56 and 58, each having a rectangular cross section with an open end for receiving air from various ducts 30, 32, 34, 36, 38, 40, 62 and 66, and extending vertically to a nozzle end 52. A plurality of first starboard bags 43 overlap a plurality of second starboard bags 44 in the horizontal direction and a plurality of first port bags 46 overlap a plurality of second port bags 47 in the horizontal direction. Also, the second starboard 44 and port 47 bags are spaced downstream from the first 43 starboard and port 46 bags. The nozzles 52 of the first starboard bags 43 are disposed in a first horizontal $V_a$-shape in relationship with the first port bags 46 to direct the emitting air in the emitting planes rearwardly and outwardly on each side of the aircraft 10 to move deicing material outwardly and rearwardly over the wings 12 and 14 and the nozzles 52 of the second starboard 44 and port 47 bags are disposed in a second horizontal $V_b$-shape with each other to direct the emitting air in the emitting planes rearwardly and outwardly from the aircraft 10 to move deicing material outwardly and rearwardly over the wings from the first starboard 43 and port 46 bags. Three third starboard bags 45 are aligned horizontally with three third port bags 48 and downstream of the second starboard 44 and port 47 bags. A plurality of starboard 56 and port 58 are disposed close together for removing deicing material from the horizontal stabilizer of the aircraft.

7 Claims, 4 Drawing Sheets

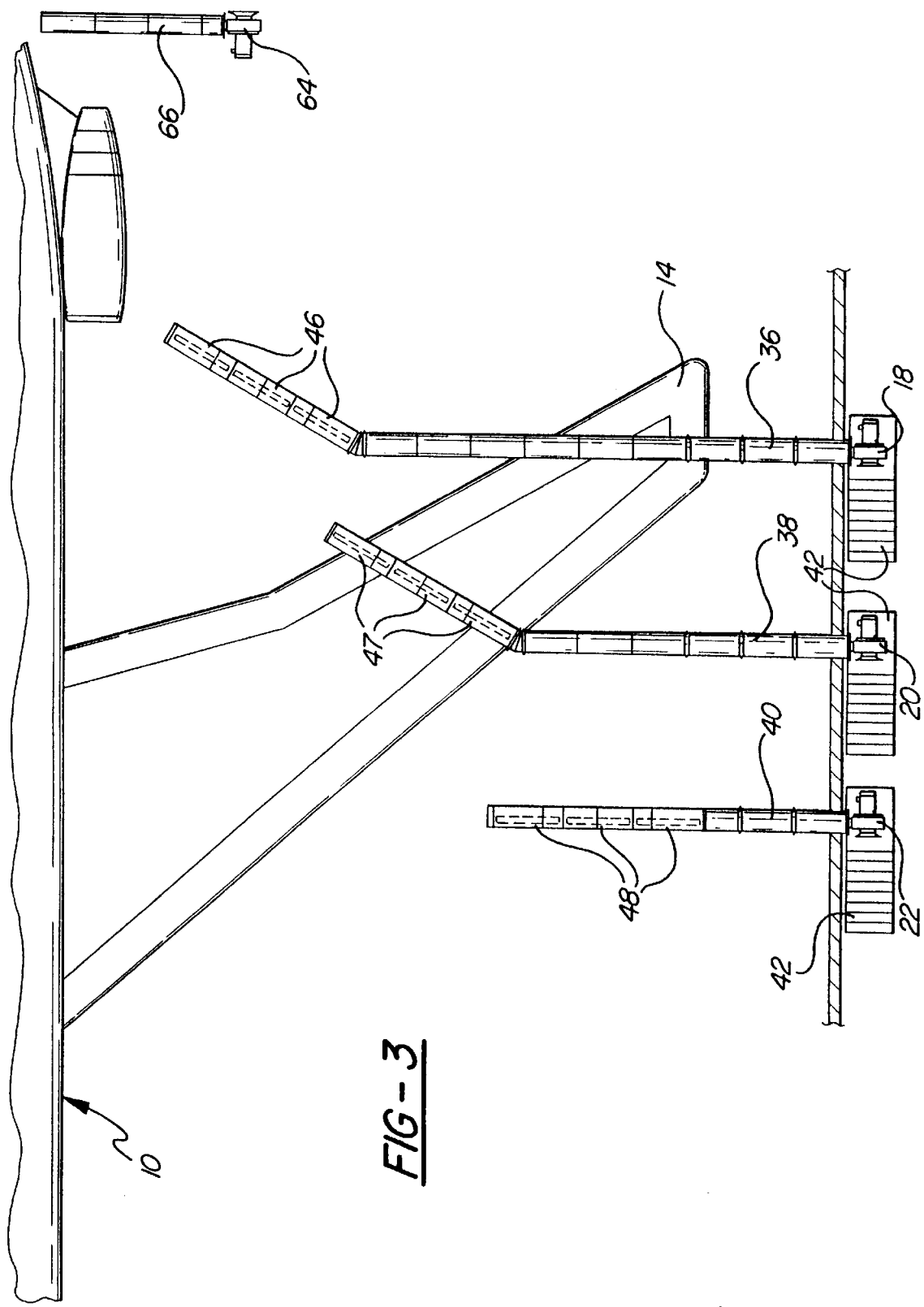

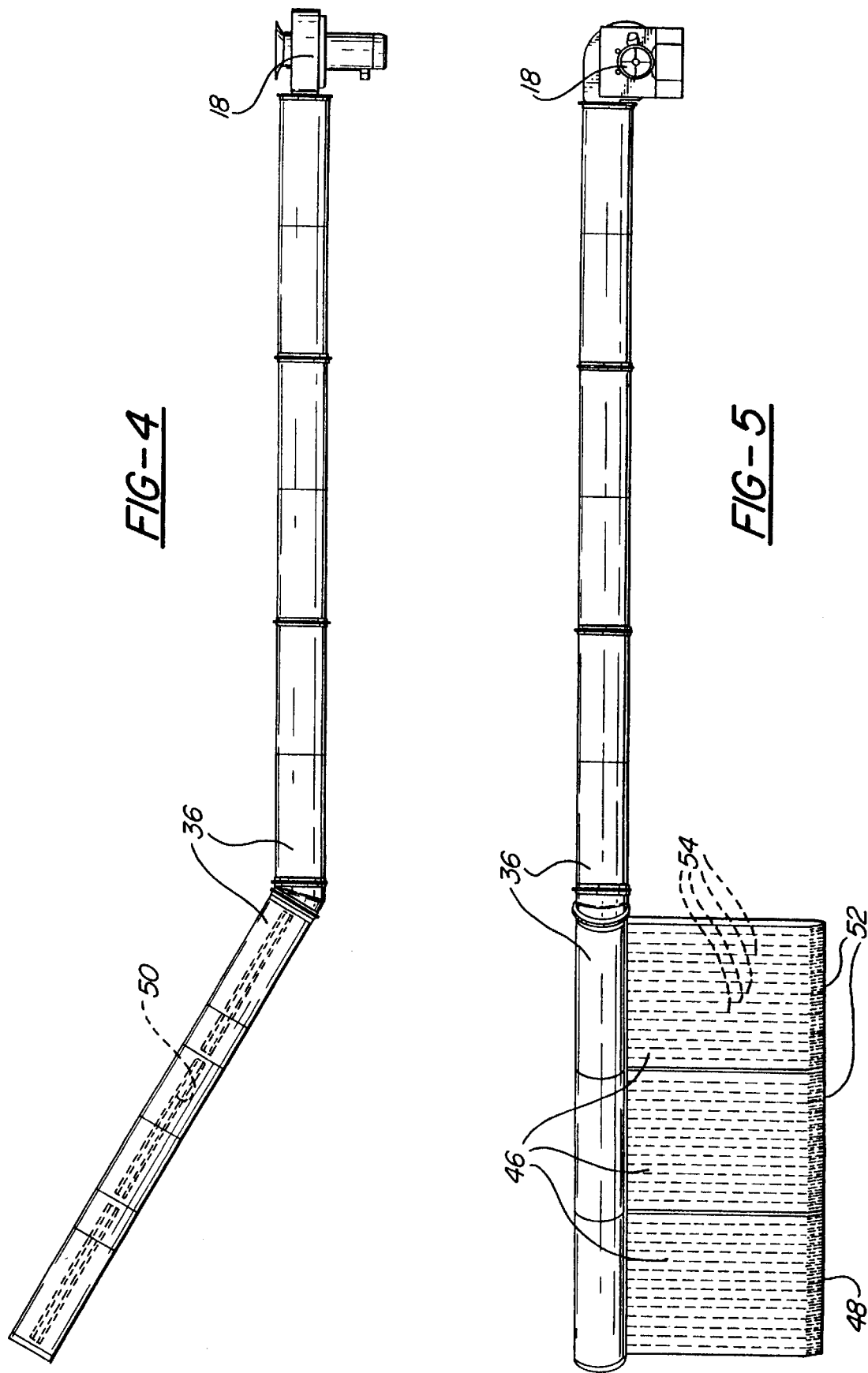

METHOD OF DE-ICING AN AIRCRAFT

RELATED APPLICATION

BACKGROUND OF THE INVENTION

This application is a divisional of application Ser. No. 09/025,061, filed Feb. 17, 1998, now U.S. Pat. No. 5,950,324.

1. Field of the Invention

The subject invention relates to an air blower assembly for removing deicing materials from the airfoil surfaces of an aircraft.

2. Description of the Prior Art

The deicing of aircraft as a procedure during certain conditions has become a routine compliance with regulations. However, this procedure normally comprises of applying a liquid to the airfoil surfaces but without removal of the deicing material from the surfaces before departure of the aircraft.

There are prior art systems for cleaning aircraft as shown in U.S. Pat. No. 3,600,224 to Stillwell. There are also various prior art systems known to the prior art for removing water from automobiles in a car wash as shown in U.S. Pat. Nos. 4,161,801; 4,418,442 and 5,553,346; all of which name the co-inventor, Lucian G. McElroy, herein as an inventor.

However, none of these systems are suitable for removing deicing materials from the airfoil surfaces of an aircraft because of the shape of the aircraft.

SUMMARY OF THE INVENTION AND ADVANTAGES

The invention provides a blower assembly has a centerline for removing deicing materials from an aircraft having wings and a horizontal stabilizer as the aircraft is disposed on the centerline. The assembly comprises a starboard plenum system for supplying air tinder pressure to the starboard side of the centerline and a port plenum system for supplying air under pressure to the port side of the centerline. A plurality of flexible and inflatable bags each have a first end in communication with one of the plenum systems for receiving air and extending to a second end. Each of the bags is of generally rectangular cross section with front and rear panels on either side of a central plane and extending between opposite sides with the front and rear panels and the sides extending between the first and second ends. The second end of the bag has an elongated opening defining a nozzle extending across the rectangular cross section between the sides of the bag for emitting air in an emitting plane disposed at an angle of less than 180° to the central plane of the bag. The bags include a first starboard bag depending vertically from the starboard plenum system with the nozzle thereof extending horizontally and a first port bag depending vertically from the port plenum system with the nozzle thereof extending horizontally. The assembly is characterized by the nozzles of the first starboard and port bags being disposed in a first horizontal $V_a$-shape with each other to direct the emitting air in the emitting planes rearwardly and outwardly on each side of the centerline to move deicing material outwardly and rearwardly over the wings of an aircraft.

Accordingly, the invention provides a method comprising the steps of emitting air from a first starboard nozzle in an emitting plane directed outwardly and rearwardly at a first horizontal plow angle relative to the longitudinal axis of the aircraft to move deicing material over the starboard wing generally in the direction of the swept-back starboard wing of the aircraft and emitting air from a first port nozzle in an emitting plane directed outwardly and rearwardly at a first horizontal plow angle relative to the longitudinal axis of the aircraft to move deicing material over the port wing generally in the direction of the swept-back port wing of the aircraft.

Therefore, the subject invention is particularly suited for removal of deicing materials from the airfoil surfaces of an aircraft.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is an enlarged plan view of the port wing and port blower assembly;

FIG. 4 is an enlarged plan view of the most rearward blower and duct assembly; and FIG. 5 is a front view of the assembly of FIG. 4.

DETAILED DESCRIPTION OF THE PREFERRED EMBODIMENT

Figure 1:
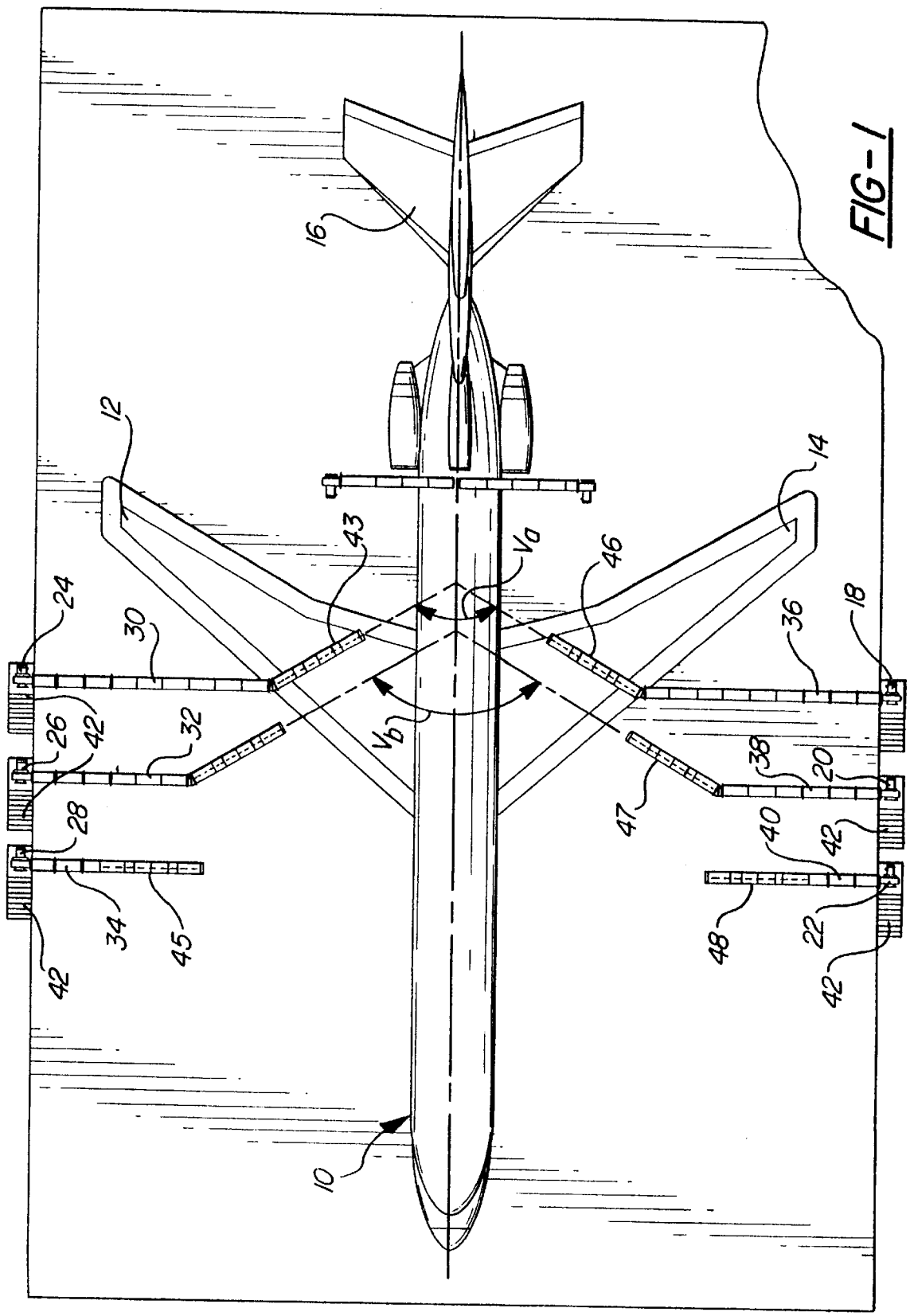
FIG. 1 is a plan view of an aircraft in the blower assembly of the subject invention.
Figure 2:
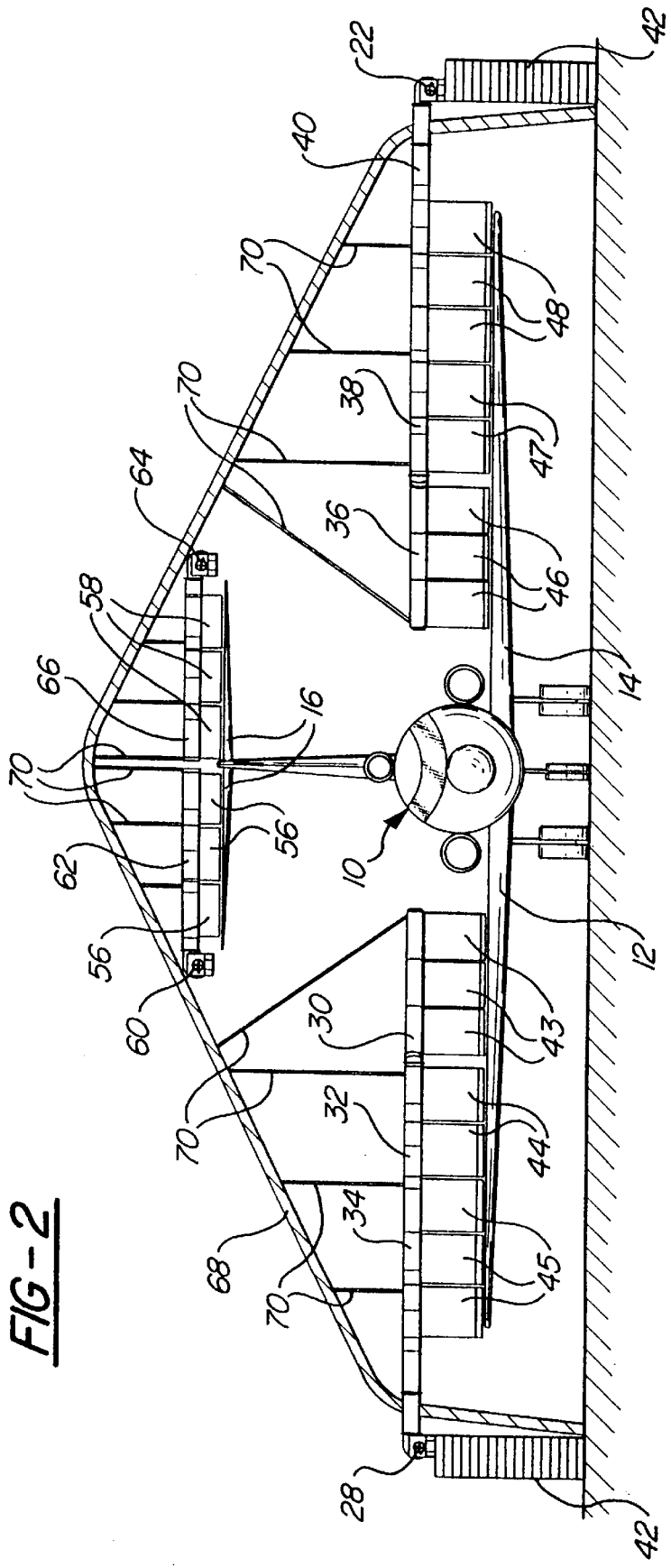
FIG. 2 is a front view of the aircraft and blower assembly of FIG. 1.

Referring to the Figures, wherein like numerals indicate like or corresponding parts throughout the several views, the subject invention relates to a blower assembly having a centerline c for removing deicing materials from an aircraft 10 having starboard and port wings 12 and 14 and a horizontal stabilizer 16 as the aircraft 10 is disposed on the centerline c.

The assembly includes a starboard plenum system for supplying air under pressure to the starboard side of the centerline c and comprising a plurality blowers 18, 20, and 22 associated with a plurality of ducts 30, 32, and 34, respectively. Each of the starboard ducts 30, 32, and 34 extend in a cantilevered fashion from the associated blower 18, 20, or 22 and are spaced along the centerline c. The assembly also includes a port plenum system for supplying air under pressure to the port side of the centerline c and comprising a plurality blowers 24, 26, and 28 associated with a plurality of ducts 36, 38 and 40, respectively. Each of the port ducts 36, 38 and 40 extend in a cantilevered fashion from the associated blower 24, 26, or 28 and are spaced along the centerline c. Each of the ducts is circular in cross section and extends horizontally from its associated blower and each blower is mounted on a platform 42 having steps for vertical access.

The assembly includes a plurality of flexible and inflatable bags 43, 44, 45, 46, 47, and 48. The bags may be of the type illustrated in U.S. Pat. No. 4,418,442 to Day et al. or U.S. Pat. No. 5,553,346 to McElroy. Each bag has a first or upper end in communication with one of the plenum systems for receiving air and extends to a second or nozzle end. The tipper end of each bag is open and wraps around the duct to receive air from an opening 50, the bag attachment being by the wrap and a fastener, a clamp or a frame. Each of the bags 43, 44, 45, 46, 47, and 48 is of generally rectangular cross section with front and rear panels on either side of a central plane and extends between opposite sides, the front and rear panels and the sides extend between the first and second ends. The second or nozzle end of the bag has an elongated opening defining a nozzle 52 extending across the rectangular cross section between the sides of the bag for emitting air in an emitting plane disposed at an angle of less than 180° to the central plane of the bag. Each bag 43, 44, 45, 46, 47, and 48 includes a plurality of spaced gussets 54 extending from top to bottom to keep the bag from ballooning. Additional shorter gussets are disposed in the nozzle of each nozzle; however, the nozzles may be molded of rigid plastic.

A plurality of three first starboard bags 43 depend vertically from the duct 30 of the starboard plenum system with the nozzle 52 thereof extending horizontally and a plurality of three first port bags 46 depend vertically from the duct 36 of the port plenum system with the nozzles thereof extending horizontally. The assembly is characterized by the nozzles 52 of the first starboard bags 43 being disposed in a first horizontal $V_a$-shape in relationship with the first port bags 46 to direct the emitting air in the emitting planes rearwardly and outwardly on each side of the centerline c to move deicing material outwardly and rearwardly over the wings 12 and 14 of the aircraft 10.

A plurality of three second starboard bags 44 depend vertically from the duct 32 of the starboard plenum system with the nozzles 52 thereof extending horizontally and a plurality of three second port bags 47 depend vertically from the duct 38 of the port plenum system with the nozzle thereof extending horizontally. The second starboard bags 44 and the second port bags 47 are spaced horizontally on the respective starboard and port sides of the centerline c farther apart than the first starboard 43 and port 46 bags are spaced horizontally apart on either side of the centerline c. However, the first starboard bags 43 overlap the second starboard bags 44 in the horizontal direction transverse to the centerline c and the first port bags 46 overlap the second port bags 47 in the horizontal direction transverse to the centerline c. Also, the second starboard 44 and port 47 bags are spaced downstream along the centerline c from the first 43 starboard and port 46 bags.

The nozzles 52 of the second starboard 44 and port 47 bags are disposed in a second horizontal $V_b$-shape with each other to direct the emitting air in the emitting planes rearwardly and outwardly from the centerline c to move deicing material outwardly and rearwardly over the wings of the aircraft 10 from the first starboard 43 and port 46 bags. In other words, the second starboard 44 and port 47 bags continue the movement of the material first moved by the first starboard 43 and port 46 bags, as well as additional deicing material originating on the wings outside the first starboard 43 and port 46 bags, along the swept back axes of the respective wings. More specifically, the internal angle $V_b$ between the legs of the second horizontal $V_b$-shape is equal to the internal angle $V_a$ between the legs of the first horizontal $V_a$-shape.

The assembly also includes three third starboard bags 45 depending vertically from the duct 34 of the starboard plenum system with the nozzles 52 thereof extending horizontally and three third port bags 48 depending vertically from the duct 40 of the port plenum system with the nozzles 52 thereof extending horizontally. The nozzles 52 of the third starboard 44 and port bags 47 are disposed parallel to each other to direct the emitting air in the emitting planes totally rearwardly on each side of and parallel to the centerline c to move deicing material rearwardly over the wings of the aircraft 10 and parallel to the centerline c of the aircraft. In the preferred embodiment illustrated, the nozzles 52 of the third starboard 44 and port bags 47 are aligned with each other, i.e., are in the same plane, which is perpendicular to the centerline c. Furthermore, the third starboard 44 and port bags 47 are spaced downstream along the centerline c from the second starboard 44 and port 47 bags.

The assembly also includes a tail plenum system and the plurality of bags includes a plurality of starboard tail bags 56 and a plurality of port tail bags 58 hanging vertically from the tail plenum system. The tail plenum system includes a starboard blower 60 and duct 62 and a port blower 64 and duct 66. The tail bags 56 and 58 are disposed closer to the centerline c than the first starboard 43 and port 46 bags and are aligned with one transversely to the centerline c. In fact, the starboard tail bags 56 are separated from the port tail bags 58 only sufficiently for the rudder of the aircraft to pass therebetween. The nozzles of the tail bags are at a higher elevation than the remaining bags for engaging the higher horizontal stabilizer.

As alluded to above, the starboard plenum system includes a separate plenum duct for each of the first 43, second 44 and third 45 starboard bags and the port plenum system includes a separate plenum duct for each of the first 46, second 47 and third 48 port bags and the tail plenum system includes a separate duct for each of the starboard 56 and port 58 tail bags. In order to maintain the ducts 30, 32, 34, 36, 38, 40, 62 and 66 over and above the aircraft, the assembly includes a suspension system for supporting each of the ducts 30, 32, 34, 36, 38, 40, 62 and 66. The suspension system comprises a roof-like framework 68 extending up and over the aircraft. Suspension cables 70 depend from the framework and are attached to the various ducts to support each of ducts in a cantilevered and horizontal disposition.

The invention, therefore, also includes a method for removing deicing materials from an aircraft 10 having wings and a horizontal stabilizer 16 by using a plurality of flexible and inflatable bags each having a generally rectangular cross section defined by front and rear panels and opposite sides extending between a first end for receiving air and a second end having a nozzle 52 extending between the sides of the bag for emitting air in an emitting plane wherein the method comprises the steps of disposing a first starboard bag 43 vertically on the starboard side of the aircraft 10 with the nozzle 52 thereof extending horizontally, disposing a first port bag 46 vertically on the port side of the aircraft 10 with the nozzle 52 thereof extending horizontally, supplying air under pressure to the first end of the starboard bag 43 to inflate the starboard bag to a stiff position with the nozzle 52 thereof engaging the starboard wing of the aircraft 10, supplying air under pressure to the first end of the port bag 46 to inflate the port bag 46 to a stiff position with the nozzle 52 thereof engaging the port wing of the aircraft 10, and characterized by disposing the nozzles 52 of the first starboard 43 and port 46 bags in a first horizontal $V_a$-shape with each other to direct the emitting air in the emitting planes rearwardly and outwardly on each side of the aircraft 10 to move deicing material outwardly and rearwardly over the wings of the aircraft 10. The method may be further implemented by disposing a second starboard bag 44 vertically on the starboard side of the aircraft 10 with the nozzle 52 thereof extending horizontally, disposing a second port bag 47 vertically on the port side of the aircraft 10 with the nozzle 52 thereof extending horizontally, spacing the second starboard 44 and port 47 bags spaced horizontally on either side of the aircraft 10 farther apart than the first starboard 43 and port 46 bags are spaced horizontally apart on either side of the aircraft 10. In yet a more limited sense, the method may be further defined as disposing the nozzles 52 of the second starboard 44 and port 47 bags in a second horizontal $V_b$-shape with each other to direct the emitting air in the emitting planes rearwardly and outwardly from the aircraft 10 to move deicing material outwardly and rearwardly over the wings of the aircraft 10 from the first starboard 43 and port 46 bags. And the legs of the second horizontal $V_b$-shape are disposed at an angle equal to the internal angle between the legs of the first horizontal $V_a$-shape.

As will be appreciated, the method may be expressed broadly as emitting air from a first starboard nozzle 52 in an emitting plane directed outwardly and rearwardly at a first horizontal plow angle ($V_a/2$) relative to the longitudinal axis of the aircraft 10 to move deicing material over the starboard wing generally in the direction of the swept-back starboard wing 12 of the aircraft 10 and emitting air from a first port nozzle 52 in an emitting plane directed outwardly and rearwardly at the first horizontal plow angle ($V_a/2$) relative to the longitudinal axis of the aircraft 10 to move deicing material over the port wing generally in the direction of the swept-back back port wing of the aircraft 10. In other words, the plow angle for each side of the aircraft is one half the included angle $V_a$ between the first starboard 43 and port 46 bags. The method may be enhanced by emitting air from a second starboard nozzle in an emitting plane disposed horizontally outwardly of and in overlapping relationship to the emitting plane of the first starboard nozzle to direct air outwardly and rearwardly at a second horizontal plow angle to continue the movement of the deicing material over the starboard wing generally in the direction of the swept-back starboard wing of the aircraft 10 and emitting air from a second port nozzle in an emitting plane disposed horizontally outwardly of and in overlapping relationship to the emitting plane of the first port nozzle to direct air outwardly and rearwardly at a second horizontal plow angle ($V_b/2$) to continue the movement of the deicing material over the starboard wing generally in the direction of the swept-back port wing of the aircraft 10. The method may be specifically defined as disposing the second plow angle ($V_b/2$) equally outwardly as the first plow angle ($V_a/2$).

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method for removing deicing materials from an aircraft (10) having wings (12 and 14) and a horizontal stabilizer (16) using a plurality of flexible and inflatable bags each having a generally rectangular cross section defined by front and rear panels and opposite sides extending between a first end for receiving air and a second end having a nozzle extending between the sides of the bag for emitting air in an emitting plane, said method comprising the steps of:

disposing a first starboard bag (43) vertically on the starboard side of the aircraft (10) with the nozzle thereof extending horizontally, disposing a first port bag (46) vertically on the port side of the aircraft (10) with the nozzle thereof extending horizontally, supplying air under pressure to the first end of the starboard bag (43) to inflate the starboard bag (43) to a stiff position with the nozzle thereof engaging the starboard wing (12) of the aircraft (10), and supplying air under pressure to the first end of the port bag (46) to inflate the port bag (46) to a stiff position with the nozzle thereof engaging the port wing (14) of the aircraft (10), said method characterized by disposing the nozzles of the first starboard (43) and port (46) bags in a first horizontal $V_a$-shape with each other to direct the emitting air in said emitting planes rearwardly and outwardly on each side of the aircraft (10) to move deicing material outwardly and rearwardly over the wings (12 and 14) of the aircraft (10).

2. A method as set forth in claim 1 including disposing a second starboard bag (44) vertically on the starboard side of the aircraft (10) with the nozzle thereof extending horizontally, disposing a second port bag (47) vertically on the port side of the aircraft (10) with the nozzle thereof extending horizontally, spacing the second starboard (44) and port (47) bags spaced horizontally on either side of the aircraft (10) farther apart than the first starboard (43) and port (46) bags are spaced horizontally apart on either side of the aircraft (10).

3. A method as set forth in claim 2 further defined as disposing the nozzles of the second starboard (44) and port (47) bags in a second horizontal $V_b$-shape with each other to direct the emitting air in the emitting planes rearwardly and outwardly from the aircraft (10) to move deicing material outwardly and rearwardly over the wings (12 and 14) of the aircraft (10) from the first starboard (43) and port (46) bags.

4. A method as set forth in claim 3 further defined as disposing the legs of the second horizontal V-shape at internal angle equal to the internal angle between the legs of the first horizontal V-shape.

5. A method for removing deicing materials from an aircraft (10) having swept-back wings (12 and 14) and a horizontal stabilizer (16) extending laterally from the longitudinal axis of the aircraft (10) fuselage by using a plurality of nozzles emitting air in an emitting plane from each nozzle, said method comprising the steps of:

emitting air from a first starboard nozzle in an emitting plane directed outwardly and rearwardly at a first horizontal plow angle relative to the longitudinal axis of the aircraft (10) to move deicing material over the starboard wing (12) generally in the direction of the swept-back starboard wing (12) of the aircraft (10), and emitting air from a first port nozzle in an emitting plane directed outwardly and rearwardly at a first horizontal plow angle relative to the longitudinal axis of the aircraft (10) to move deicing material over the port wing (14) generally in the direction of the swept-back port wing (14) of the aircraft (10).

6. A method as set forth in claim 5 including the steps of emitting air from a second starboard nozzle in an emitting plane disposed horizontally outwardly of and in overlapping relationship to the emitting plane of the first starboard nozzle to direct air outwardly and rearwardly at a second horizontal plow angle different to continue the movement of the deicing material over the starboard wing (12) generally in the direction of the swept-back starboard wing (12) of the aircraft (10) and emitting air from a second port nozzle in an emitting plane disposed horizontally outwardly of and in overlapping relationship to the emitting plane of the first port nozzle to direct air outwardly and rearwardly at a second horizontal plow angle to continue the movement of the deicing material over the starboard wing (12) generally in the direction of the swept-back port wing (14) of the aircraft (10).

7. A method as set forth in claim 6 further defined as disposing the second plow angle equally to the first plow angle.

* * * * *